United States Patent
Fukushige et al.

(10) Patent No.: US 11,167,758 B2
(45) Date of Patent: Nov. 9, 2021

(54) VEHICLE POSITION CORRECTION METHOD AND VEHICLE POSITION CORRECTION DEVICE FOR DRIVE-ASSISTED VEHICLE

(71) Applicant: Nissan Motor Co., Ltd., Yokohama (JP)

(72) Inventors: Takashi Fukushige, Kanagawa (JP); Satoshi Tange, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 16/638,791

(22) PCT Filed: Aug. 30, 2017

(86) PCT No.: PCT/JP2017/031166
§ 371 (c)(1),
(2) Date: Feb. 13, 2020

(87) PCT Pub. No.: WO2019/043831
PCT Pub. Date: Mar. 7, 2019

(65) Prior Publication Data
US 2020/0377088 A1    Dec. 3, 2020

(51) Int. Cl.
*B60W 30/12*    (2020.01)
*B60W 40/105*    (2012.01)
(Continued)

(52) U.S. Cl.
CPC .......... *B60W 30/12* (2013.01); *B60W 40/105* (2013.01); *B60W 50/0225* (2013.01);
(Continued)

(58) Field of Classification Search
None
See application file for complete search history.

(56) References Cited

U.S. PATENT DOCUMENTS 6,038,496 A    3/2000  Dobler et al.
7,808,523 B2 * 10/2010 Nishida ............... G06T 7/12
348/148
(Continued)

FOREIGN PATENT DOCUMENTS

CN    101443831 A    5/2009
CN    103954275 A    7/2014
(Continued)

*Primary Examiner* — Jonathan M Dager
(74) *Attorney, Agent, or Firm* — Global IP Counselors, LLP

(57) ABSTRACT

A vehicle position correction device corrects a position error of an host vehicle provided with a navigation control unit that includes a target route corrector that corrects a target route. The target route corrector detects a lane boundary of a lane in which the host vehicle travels. The target route corrector compares positional relationships between a detect lane boundary and a target route on a map, and calculates a lateral correction amount for the target route in situations where the target route is within a prescribed distance of the lane boundary, or in situations where the target route is on an opposite side of the lane boundary to the host vehicle. Upon calculating the lateral correction amount, the target route corrector moves the target route sideways in a lateral direction by the lateral correction amount to correct the target route.

19 Claims, 9 Drawing Sheets

(51) Int. Cl.
  *B60W 50/02* (2012.01)
  *B60W 50/08* (2020.01)
  *G06K 9/00* (2006.01)
(52) U.S. Cl.
  CPC ......... *B60W 50/08* (2013.01); *G06K 9/00798* (2013.01); *B60W 2552/53* (2020.02)

(56) References Cited

U.S. PATENT DOCUMENTS

| | | | |
|---|---|---|---|
| 8,433,467 | B2 | 4/2013 | Ross-Martin |
| 8,831,876 | B2* | 9/2014 | Hayashi ............ G01C 21/3438 701/428 |
| 9,731,755 | B1* | 8/2017 | Moshchuk ............... B62D 6/00 |
| 10,384,672 | B1* | 8/2019 | Katzourakis .......... B60W 10/04 |
| 10,518,776 | B2* | 12/2019 | Kang ................. B60W 30/143 |
| 2007/0048084 | A1* | 3/2007 | Jung ........................ G09F 9/35 404/9 |
| 2008/0288163 | A1* | 11/2008 | Asano ................ G01C 21/3658 701/118 |
| 2009/0284360 | A1* | 11/2009 | Litkouhi ............. B62D 15/025 340/439 |
| 2010/0082195 | A1* | 4/2010 | Lee ........................ G01C 21/12 701/25 |
| 2011/0044507 | A1* | 2/2011 | Strauss ................. G01S 13/867 382/103 |
| 2011/0098919 | A1* | 4/2011 | Irie ........................ G08G 1/167 701/533 |
| 2011/0106420 | A1* | 5/2011 | Nishibashi ........... G01C 21/367 701/532 |
| 2011/0178689 | A1* | 7/2011 | Yasui ....................... B60W 30/14 701/70 |
| 2013/0103304 | A1* | 4/2013 | Nishibashi ........... G01C 21/34 701/410 |
| 2015/0145664 | A1* | 5/2015 | You ....................... B60W 30/12 340/438 |
| 2015/0149036 | A1* | 5/2015 | You ....................... B60W 30/12 701/41 |
| 2015/0355641 | A1* | 12/2015 | Choi ....................... G05D 1/021 701/23 |
| 2015/0375784 | A1* | 12/2015 | Ogawa ................... G08G 1/167 701/41 |
| 2016/0107682 | A1* | 4/2016 | Tan ......................... B62D 6/00 701/41 |
| 2016/0107687 | A1* | 4/2016 | Yamaoka ........... B62D 15/0255 701/41 |
| 2016/0114832 | A1* | 4/2016 | Taniguchi ............ B62D 15/025 701/41 |
| 2016/0221604 | A1* | 8/2016 | Yamaoka ............. B62D 15/025 |
| 2016/0272203 | A1* | 9/2016 | Otake ................... B60W 50/14 |
| 2016/0318512 | A1* | 11/2016 | Yamaoka ............. B60W 30/12 |
| 2016/0375901 | A1* | 12/2016 | Cairano ............. G01C 21/3453 701/26 |
| 2017/0018189 | A1* | 1/2017 | Ishikawa .............. G05D 1/0088 |
| 2017/0066445 | A1* | 3/2017 | Habu ................... B62D 15/026 |
| 2017/0088168 | A1* | 3/2017 | Oyama ................ B62D 15/025 |
| 2017/0123434 | A1* | 5/2017 | Urano ................... B60W 40/10 |
| 2017/0136842 | A1* | 5/2017 | Anderson ............ A61B 5/4023 |
| 2017/0203770 | A1* | 7/2017 | Kondo ................. G05D 1/0088 |
| 2017/0240186 | A1* | 8/2017 | Hatano ........... B60W 30/18163 |
| 2017/0248959 | A1* | 8/2017 | Matsubara ............ B60W 10/20 |
| 2017/0259819 | A1* | 9/2017 | Takeda .................. B60W 10/04 |
| 2017/0261989 | A1* | 9/2017 | Ishioka ................ G05D 1/0212 |
| 2017/0274898 | A1* | 9/2017 | Nakamura ...... B60W 30/18163 |
| 2017/0291603 | A1* | 10/2017 | Nakamura .......... B60W 30/095 |
| 2017/0329338 | A1* | 11/2017 | Wei ..................... G05D 1/0212 |
| 2017/0336788 | A1* | 11/2017 | Iagnemma ........... G05D 1/0246 |
| 2017/0349172 | A1* | 12/2017 | Kubota ........... B60W 30/18163 |
| 2018/0037216 | A1* | 2/2018 | Otake ............. B60W 30/18109 |
| 2018/0037260 | A1* | 2/2018 | Otake .................. B62D 15/025 |
| 2018/0126986 | A1* | 5/2018 | Kim .................... B60W 50/087 |
| 2018/0188031 | A1* | 7/2018 | Samper ................ B60W 10/20 |
| 2018/0190123 | A1* | 7/2018 | Oka ....................... B62D 6/001 |
| 2018/0237007 | A1* | 8/2018 | Adam ................... B60W 30/12 |
| 2018/0237008 | A1* | 8/2018 | Matsumura .......... B62D 15/025 |
| 2018/0297640 | A1* | 10/2018 | Fujii .................. B62D 15/0255 |
| 2018/0339708 | A1* | 11/2018 | Geller ................ B60W 50/0097 |
| 2019/0084571 | A1* | 3/2019 | Zhu ....................... B60W 10/20 |
| 2019/0096258 | A1* | 3/2019 | Ide ........................ B62D 15/025 |
| 2019/0266890 | A1* | 8/2019 | Lei ....................... G08G 1/09675 |
| 2019/0315348 | A1* | 10/2019 | Mimura ............. G01C 21/3632 |
| 2019/0315365 | A1* | 10/2019 | Kim .................... B60W 50/14 |
| 2019/0318174 | A1* | 10/2019 | Miklos ................... G01C 21/32 |
| 2020/0050195 | A1* | 2/2020 | Gross ............. B60W 60/00272 |
| 2020/0094837 | A1* | 3/2020 | Kato .................... G05D 1/0248 |
| 2020/0180619 | A1* | 6/2020 | Lee ....................... B60W 50/12 |
| 2020/0180634 | A1* | 6/2020 | Hammoud ............ B60W 30/09 |
| 2020/0189582 | A1* | 6/2020 | Fukushige ............ B60W 10/18 |
| 2020/0219392 | A1* | 7/2020 | Pogel ................. G01C 21/3658 |
| 2020/0240806 | A1* | 7/2020 | Daikoku .................. G08G 1/04 |
| 2020/0284610 | A1* | 9/2020 | Hatayama ........ G08G 1/096708 |
| 2020/0307589 | A1* | 10/2020 | Li ........................ B60W 30/16 |
| 2020/0377089 | A1* | 12/2020 | Fukushige ......... G01C 21/3407 |

FOREIGN PATENT DOCUMENTS

| | | |
|---|---|---|
| CN | 105022985 A | 11/2015 |
| DE | 10 2005 025 387 A1 | 5/2006 |
| JP | 2015-205635 A | 11/2015 |
| JP | 2016-151864 A | 8/2016 |
| JP | 2017-13586 A | 1/2017 |

* cited by examiner

VEHICLE POSITION CORRECTION METHOD AND VEHICLE POSITION CORRECTION DEVICE FOR DRIVE-ASSISTED VEHICLE

CROSS-REFERENCE TO RELATED APPLICATIONS

This application is a U.S. national stage application of International Application No. PCT/JP2017/031166, filed on Aug. 30, 2017.

BACKGROUND

Technical Field

The present disclosure relates to a method and device for correcting a position error of a drive-assisted vehicle, with which error arising between a position of a host vehicle and a target route during drive-assisted travel is corrected.

Background Information

Conventionally, in situations where a steering override is detected and then the end of the steering override is detected during control of autonomous driving or other travel, the driver is presumed to have returned the host vehicle to a travel route set in the center of white lines. One known device for estimating a position of a host vehicle assumes that the position at which the steering override ends is inside a lane, and corrects the self-position of the host vehicle by an amount of GPS/map divergence (e.g., see Japanese Laid-Open Patent Application No. 2017-13586—Patent Document 1).

SUMMARY

However, with this conventional device, the self-position of the host vehicle is corrected, and thus any correction applied must take into account all modules that use self-position information, and correction that focuses on vehicle behavior cannot be performed. In other words, because correcting the self-position of the host vehicle usually prioritizes "non-departing/non-colliding," large corrections to vehicle behavior are sometimes unnecessarily performed, and "smoothness" is sacrificed.

The present disclosure focuses on the above problem, it being an object hereof to enable the selection of whether to prioritize smoothness or to prioritize non-departure, depending on the scenario, and to achieve vehicle behavior where it is possible to feel more at ease.

In order to achieve the above objective, in the present disclosure, a controller is provided that corrects error arising between a position of a host vehicle and a target route during drive-assisted travel.
In a method for correcting a position error of a drive-assisted vehicle, a lane boundary of a lane in which the host vehicle travels is detected.
Positional relationships between the lane boundary that was detected and a target route on a map are compared, and in situations where the target route is within a prescribed distance of the lane boundary, or in situations where the target route is on the opposite side of the lane boundary to the host vehicle, the target route is corrected with a sideways movement amount in a lateral direction.
By correcting a target route with sideways movement rather than correcting the self-position of the host vehicle, as described above, it is possible to select whether to prioritize smoothness or to prioritize non-departure, depending on the scenario, and vehicle behavior where it is possible to feel more at ease can be achieved.

DETAILED DESCRIPTION OF THE EMBODIMENTS

Figure 1:
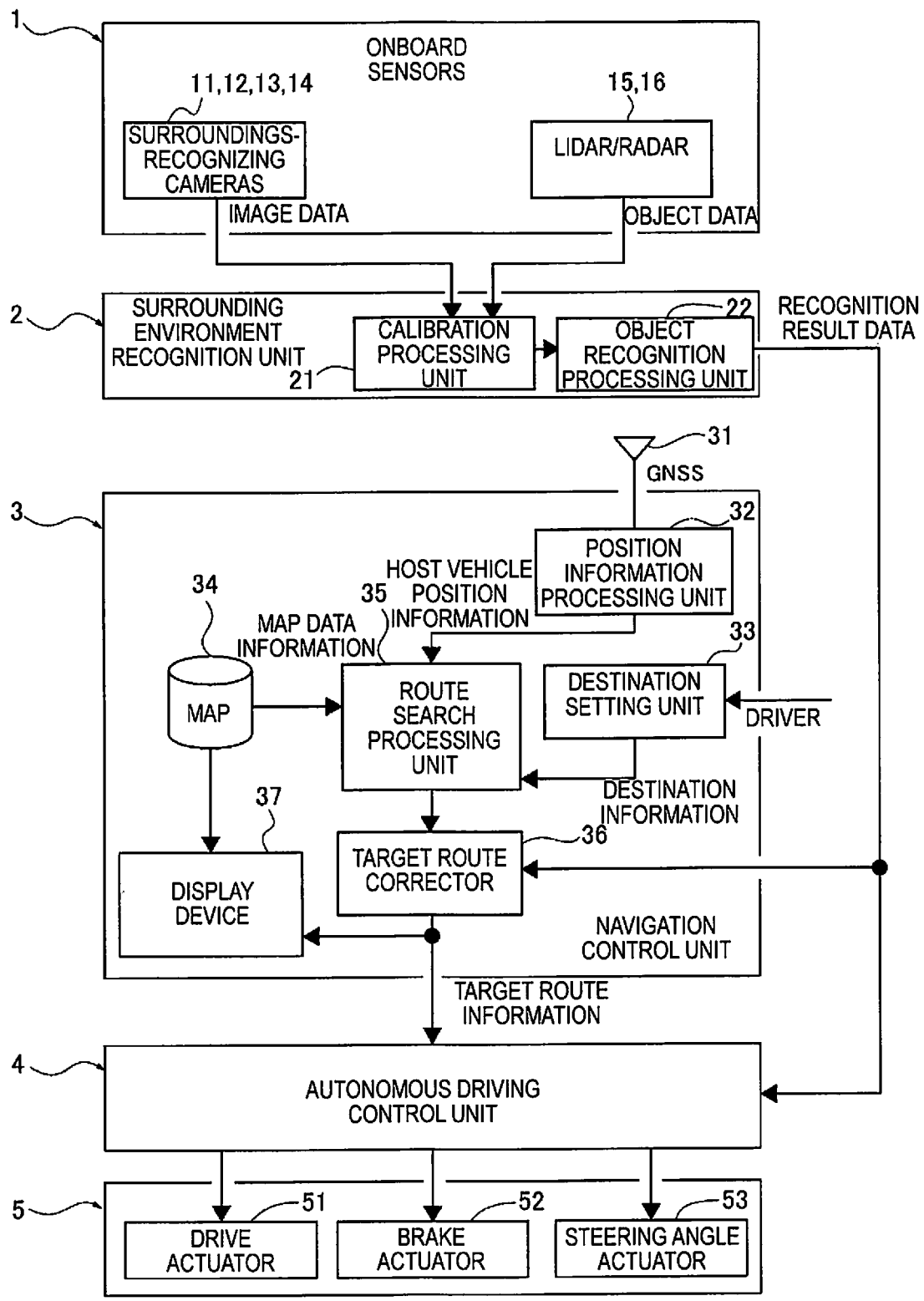
FIG. 1 is an overall system diagram illustrating an autonomous driving control system to which a method and device for correcting a position error of a first embodiment have been applied.

A preferred embodiment for implementing a method and device for correcting a position error of a drive-assisted vehicle according to the present disclosure will be described below with reference to a first embodiment illustrated in the drawings.

First Embodiment

First, the configuration will be described. The method and device for generating a target method and device for correcting a position error of the first embodiment are applied to an autonomous vehicle (one example of a drive-assisted vehicle) in which steering/drive/braking are automatically controlled according to an autonomous driving mode selection using target route information generated by a navigation control unit. The configuration of the first embodiment will be described under the headings "Overall system configuration," "Detailed configuration of navigation control unit," and "Overall configuration of target route corrector," "Detailed configuration of road boundary information consolidation unit," and "Detailed configuration of lateral correction amount calculation unit."

Overall System Configuration

Figure 2:
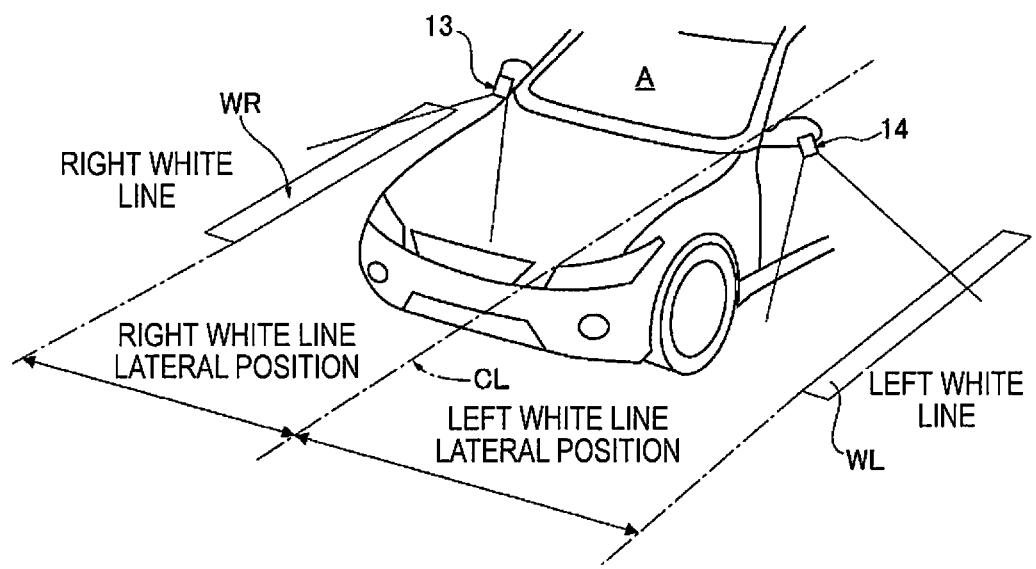
FIG. 2 is a perspective view illustrating, among onboard sensors, a left recognition camera and a right recognition camera of the first embodiment.
Figure 3:
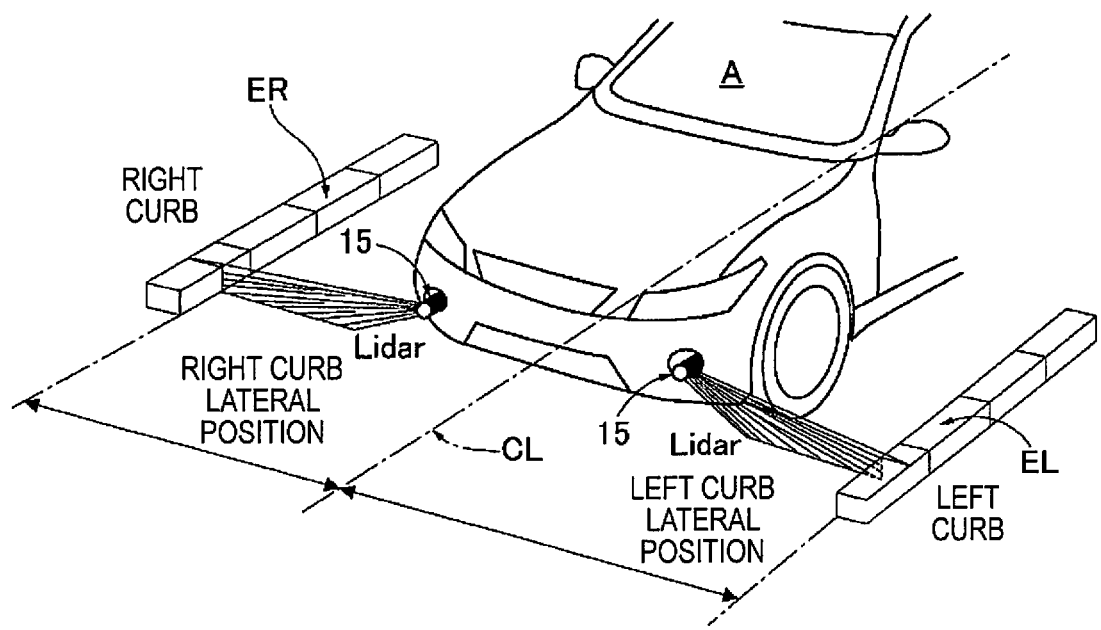
FIG. 3 is a perspective view illustrating, among onboard sensors, lidar provided at left and right positions at the front of a vehicle of the first embodiment.

FIG. 1 illustrates an autonomous driving control system to which the method and device for correcting a position error of the first embodiment have been applied. FIG. 2 illustrates, among onboard sensors, a left recognition camera and a right recognition camera. FIG. 3 illustrates, among onboard sensors, lidar provided at left and right positions at the front of a vehicle. The overall system configuration will be described below with reference to FIGS. 1 to 3.

As illustrated in FIG. 1, the autonomous driving control system comprises onboard sensors 1, a surrounding environment recognition unit 2, a navigation control unit 3, an autonomous driving control unit 4, and actuators 5. The surrounding environment recognition unit 2, the navigation control unit 3, and the autonomous driving control unit 4 are computers that comprise a CPU or other processing unit and execute arithmetic processing.

The onboard sensors 1 are sensors that are mounted on an autonomous vehicle and acquire information about the surroundings of the host vehicle. The onboard sensors 1 include a forward recognition camera 11, a rear recognition camera 12, a right recognition camera 13, a left recognition camera 14, lidar 15, and radar 16. The onboard sensors 1 include, as sensors that acquire information required for autonomous driving control other than information about the surroundings of the host vehicle, a vehicle speed sensor, a yaw rate sensor, a turn signal switch, etc. (none of which are illustrated).

In combination, the forward recognition camera 11, the rear recognition camera 12, the right recognition camera 13, and the left recognition camera 14 configure a surroundings-recognizing camera (around view monitor (AVM)). This surroundings-recognizing camera detects objects in a travel path of the host vehicle, objects outside of the travel path of the host vehicle (road structures, leading vehicles, trailing vehicles, oncoming vehicles, neighboring vehicles, pedestrians, bicycles, motor bikes), the travel path of the host vehicle (white road lines, road boundaries, stop lines, pedestrian crossings), road signs (speed limits), etc.

As illustrated in FIG. 2, the right recognition camera 13 is a fish-eye camera that is built into a right door mirror. The right recognition camera 13 has a right white line lateral position detecting function. As illustrated in FIG. 2, the left recognition camera 14 is a fish-eye camera that is built into a left door mirror. The left recognition camera 14 has a left white line lateral position detecting function.

Right white line lateral position refers to a length to an inside edge position of a right white line WR from a position of a vehicle width direction center line CL of a host vehicle A. Left white line lateral position refers to a length to an inside edge position of a left white line WL from a position of the vehicle width direction center line CL of the host vehicle A.

The lidar 15 and the radar 16 are disposed at positions at the front end of the host vehicle with the output wave illumination axes thereof pointing in front of the vehicle. By receiving waves that are reflected back, the lidar 15 and the radar 16 detect presence of objects in front of the host vehicle and distances to objects in front of the host vehicle are detected. The lidar 15 and the radar 16, which are two types of ranging sensors, combine to configure lidar/radar, and, for example, a laser radar, a millimeter wave radar, an ultrasonic radar, a laser range finder, etc., can be employed therefor. The lidar 15 and the radar 16 detect positions of and distances to objects, including objects in the travel path of the host vehicle, and objects outside of the travel path of the host vehicle (road structures, leading vehicles, trailing vehicles, oncoming vehicles, neighboring vehicles, pedestrians, bicycles, motor bikes).

As illustrated in FIG. 3, the lidar 15 are swingably provided at left and right positions at the front end of the host vehicle A, pointed obliquely downward and to the right and pointed obliquely downward and to the left. The lidar 15 have a right curb lateral position detecting function and a left curb lateral position detecting function. Right curb lateral position refers to a length to an inside edge position of a right curb ER from a position of the vehicle width direction center line CL of the host vehicle A. Left curb lateral position refers to a length to an inside edge position of a left curb EL from a position of the vehicle width direction center line CL of the host vehicle A.

The surrounding environment recognition unit 2 receives, as inputs, image data from the recognition cameras 11, 12, 13, 14 and object data from the lidar/radar 15, 16. The surrounding environment recognition unit 2 includes a calibration processing unit 21 that generates calibration data for image data and object data, and an object recognition processing unit 22 that performs object recognition processing on the basis of the calibration data.

The calibration processing unit 21 estimates a parameter for image data from the recognition cameras 11, 12, 13, 14 and a parameter for object data from the lidar/radar 15, 16, and uses these parameters to generate and output image data and object data calibration data. For example, in the case of image data from the recognition cameras 11, 12, 13, 14, the calibration processing unit 21 uses the parameters to perform the correction, etc., of optical axes and lens distortion.

The object recognition processing unit 22 receives, as input, calibration data from the calibration processing unit 21, performs object recognition processing on the basis of the calibration data, and outputs recognition result data. The object recognition processing unit 22, for example, performs processing comparing image data and object data, and when it has been confirmed, using the object data, that an object is present at a position for an object candidate that is based on the image data, the object recognition processing unit 22 recognizes that an object is present and recognizes what the object is.

The navigation control unit 3 receives, as input, host vehicle position information from a GNSS antenna 31, combines GPS (global positioning system) utilizing satellite communications with map data, including road information, and generates a target route to a destination from a current position using a route search. In addition to displaying the generated target routes on a map, and the navigation control unit 3 outputs the target route information.

"GNSS" is short for "global navigation satellite system," and "GPS" is short for "global positioning system." Detailed configuration of the navigation control unit 3 will be described below.

The autonomous driving control unit 4 receives, as inputs, recognition result data from the object recognition processing unit 22 of the surrounding environment recognition unit 2, and target route information from the navigation control unit 3. The autonomous driving control unit 4 generates target vehicle speeds, target rates of acceleration, and target rates of deceleration on the basis of the input information. The autonomous driving control unit 4 derives drive control command values using a target rate of acceleration that was generated, and outputs a result of this derivation to a drive actuator 51. The autonomous driving control unit 4 derives brake control command values using a target rate of deceleration that was generated, and outputs a result of this derivation to a brake actuator 52. The autonomous driving control unit 4 derives steering control command values using target route information inputted thereto, and outputs a result of this derivation to a steering actuator 53.

The actuators 5 include the drive actuator 51, the brake actuator 52, and the steering actuator 53.

The drive actuator 51 receives, as input, a drive control command value from the autonomous driving control unit 4 and controls the drive force of a drive source. In other words, in the case of a vehicle with an engine, the drive actuator 51 is an engine actuator. In the case of a hybrid vehicle, the drive actuator 51 is an engine actuator and a motor actuator. In the case of an electric vehicle, the drive actuator 51 is a motor actuator.

The brake actuator 52 receives, as input, a brake control command value from the autonomous driving control unit 4 and controls the braking force of brakes. A hydraulic booster, an electric booster, etc., is used as the brake actuator 52.

The steering actuator 53 receives, as input, a steering control command value from the autonomous driving control unit 4 and controls the steering angle of a steering wheel. A steering angle control motor, etc., is used as the steering angle actuator 53.

Detailed Configuration of Navigation Control Unit

Detailed configuration of the navigation control unit 3, which sets a destination, derives an optimal target route, and displays the target route for autonomous driving, will be described below with reference to FIG. 1.

As illustrated in FIG. 1, the navigation control unit 3 comprises the GNSS antenna 31, a position information processing unit 32, a destination setting unit 33, a map data storage unit 34, a route search processing unit 35, a target route corrector 36, and a display device 37.

The position information processing unit 32 performs processing for detecting the latitude and longitude of stopping positions of the host vehicle and travel positions of the host vehicle on the basis of satellite communication information inputted from the GNSS antenna 31. Host vehicle position information from the position information processing unit 32 is outputted to the route search processing unit 35.

A destination for the host vehicle is inputted into, and set in, the destination setting unit 33 via, inter alia, a touch panel operation on a display screen of the display device 37 by the driver. Destination information from the destination setting unit 33 is outputted to the route search processing unit 35.

The map data storage unit 34 is a storage unit for so-called digital map data in which latitude/longitude and map information are associated. The map data includes road information that has been associated with respective points. The road information is defined by nodes and links that connect nodes together. The road information includes information that specifies roads according to road position/area, and information indicating a type of each road, a width of each road, and road geometry. The position of intersections, the directions of approach of intersections, intersection type, and other information relating to intersections is stored in association with respective identification information for each road link in the road information. Road type, road width, road geometry, whether forward progress is permitted, right-of-way relationships, whether passing is permitted (whether entering an adjacent lane is permitted), speed limit, and other information relating to roads is also stored in association with respective identification information for each road link in the road information.

The route search processing unit 35 receives, as input, host vehicle position information from the position information processing unit 32, destination information from the destination setting unit 33, and road map information (road map data) from the map data storage unit 34. The route search processing unit 35 generates a target route by performing a route cost computation, etc., on the basis of the road map information. GPS and a map can be used to generate a target route. Alternatively, instead of using GPS and a map, when a leading vehicle is present, a travel trajectory of the leading vehicle can be used as a target route. In such case, when the positional accuracy of GPS is low, using this travel trajectory decreases a sideways movement amount by the target route corrector 36, described below, and vehicle behavior can be made smoother.

The target route corrector 36 receives, as inputs, recognition result data from the object recognition processing unit 22, and a target route from the route search processing unit 35. In addition to a target route, the target route corrector 36 receives, as inputs, (left and right) lateral direction distances to white lines, (left and right) lateral direction distances to stationary objects, (left and right) lateral direction distances to curbs, a direction indicator (turn signal) in-use-by-driver condition, a lane-change condition, and information such as vehicle speed. The target route corrector 36 detects lane boundaries of the lane in which the host vehicle travels on the basis of this input information. The target route corrector 36 compares positional relationships between lane boundaries that were detected and a target route on a map, and in situations where the target route is within a prescribed distance of a lane boundary, or in situations where the target route is on the opposite side of a lane boundary to the host vehicle, the target route is corrected with sideways movement in the lateral direction.

"Prescribed distance" refers to a distance at which a sense of unease would be imparted to the driver when the host vehicle approaches a lane boundary. For example, when the distance from the vehicle width direction center line of the host vehicle to a lane boundary is approximately 2 m (when the distance from a side of the host vehicle to a lane boundary is approximately 1 m). In situations where a target route is on the opposite side of a lane boundary to the host vehicle, the target route is corrected with sideways movement in the lateral direction no matter what the distance to the host vehicle.

The display device 37 receives, as inputs, map data information from the map data storage unit 34 and target route information from the target route corrector 36. The display device 37 displays a map, roads, a target route, a position of the host vehicle, and a destination on a display screen. In other words, during autonomous travel the display device 37 provides information visually representing the position of host vehicle on the map, such as for where the host vehicle is moving.

Overall Configuration of Target Route Corrector

Figure 4:
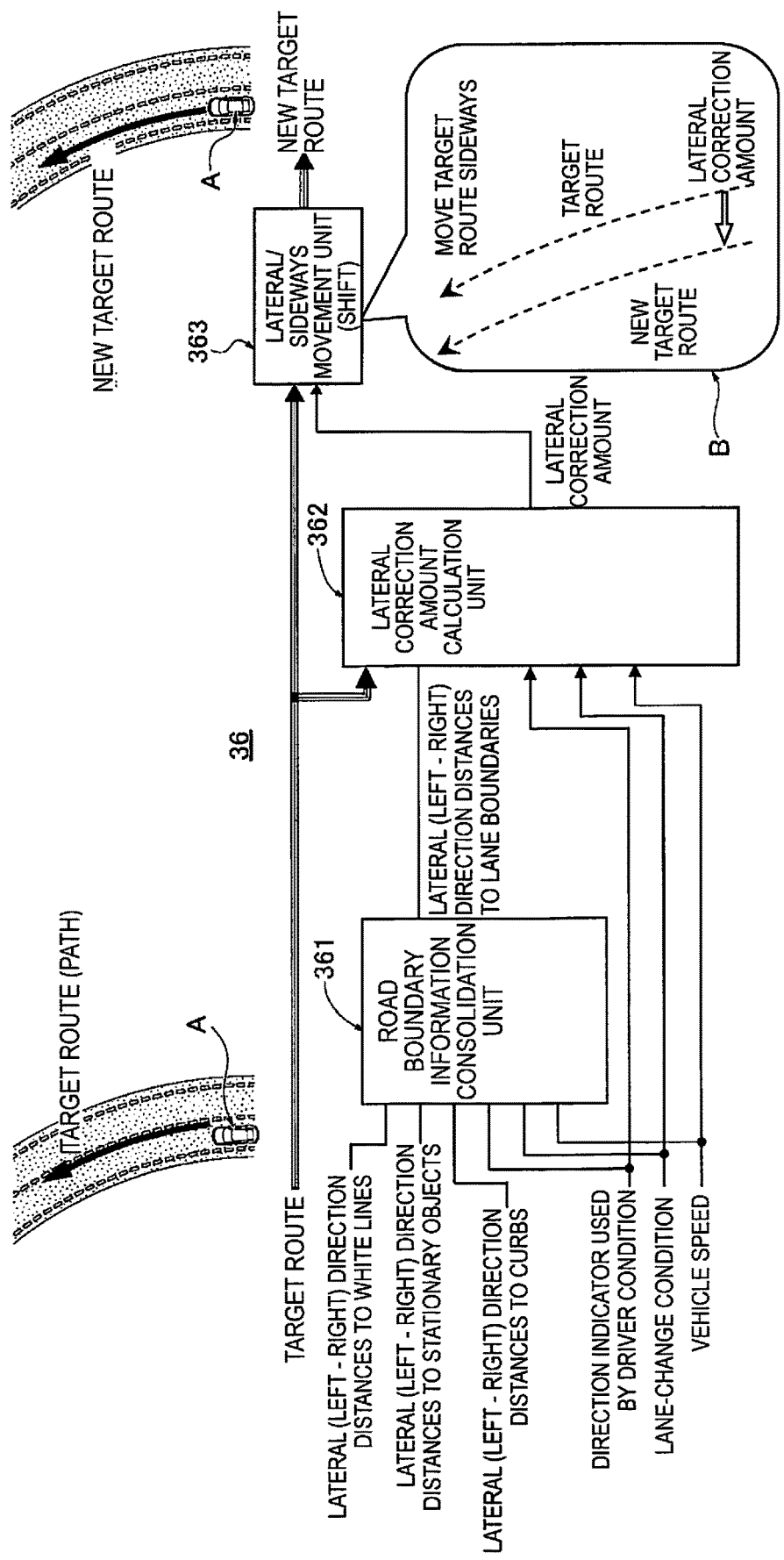
FIG. 4 is an overall block diagram illustrating a target route corrector of a navigation control unit of the first embodiment.

FIG. 4 illustrates the target route corrector 36 of the navigation control unit 3 (controller) in the first embodiment. Overall configuration of the target route corrector 36 will be described below with reference to FIG. 4.

The target route corrector 36 corrects navigational errors arising between a position of the host vehicle and a target route when the position of the host vehicle, detected using navigation information, is overlaid onto map information during autonomous travel. This correction is made with lateral/sideways movement of the target route. As illustrated in FIG. 4, the target route corrector 36 includes a road boundary information consolidation unit 361 (lane boundary detection unit), a lateral correction amount calculation unit 362, and a lateral/sideways movement unit 363.

The road boundary information consolidation unit 361 receives, as inputs, (left and right) lateral direction distances to white lines, (left and right) lateral direction distances to stationary objects, (left and right) lateral direction distances to curbs, a direction indicator (turn signal) in-use-by-driver condition, a lane-change condition, and information such as vehicle speed. The road boundary information consolidation unit 361 detects lane boundaries of the lane in which the host vehicle A travels, and outputs (left and right) lateral direction distances to the lane boundaries, with respect to the host vehicle A, to the lateral correction amount calculation unit 362.

The lateral correction amount calculation unit 362 receives, as inputs, a target route from the route search processing unit 35, (left and right) lateral direction distances to lane boundaries from the road boundary information consolidation unit 361, a direction indicator in-use-by-driver condition, a lane-change condition, and information such as vehicle speed. The lateral correction amount calculation unit 362 compares positional relationships between lane boundaries that have been detected and a target route on a map, and in situations where the target route is within a prescribed distance of a lane boundary, or in situations where the target route is on the opposite side of a lane boundary to the host vehicle A, calculates a lateral correction amount for the target route.

The lateral/sideways movement unit 363 receives, as inputs, a target route from the route search processing unit 35, and a lateral correction amount from the lateral correction amount calculation unit 362. As illustrated in bubble B in the lower right part of FIG. 4, upon the calculation of a lateral correction amount, the lateral/sideways movement unit 363 moves the target route sideways in the lateral direction by the lateral correction amount to correct the target route, and a new target route is generated. In correcting the target route with sideways movement, a degree of alignment between a direction of progress of the host vehicle A and the new target route is able to be increased when the direction of progress of the host vehicle A and the target route diverge from one another.

Detailed Configuration of Road Boundary Information Consolidation Unit

Figure 5:
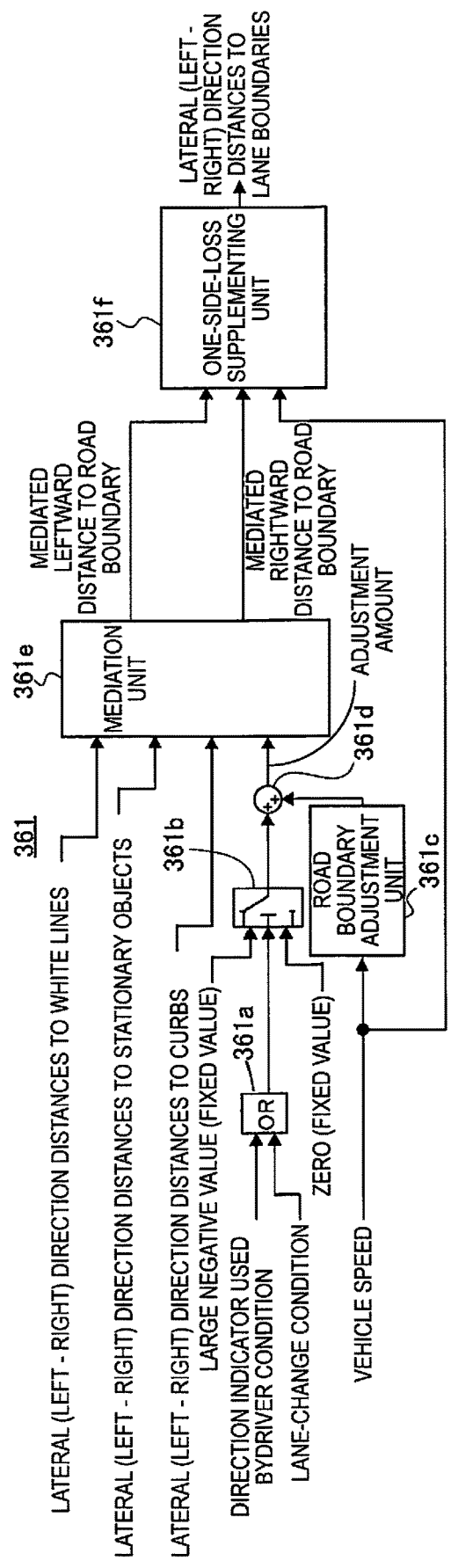
FIG. 5 is a detailed block diagram illustrating a road boundary information consolidation unit in the target route corrector illustrated in FIG. 4.
Figure 6:
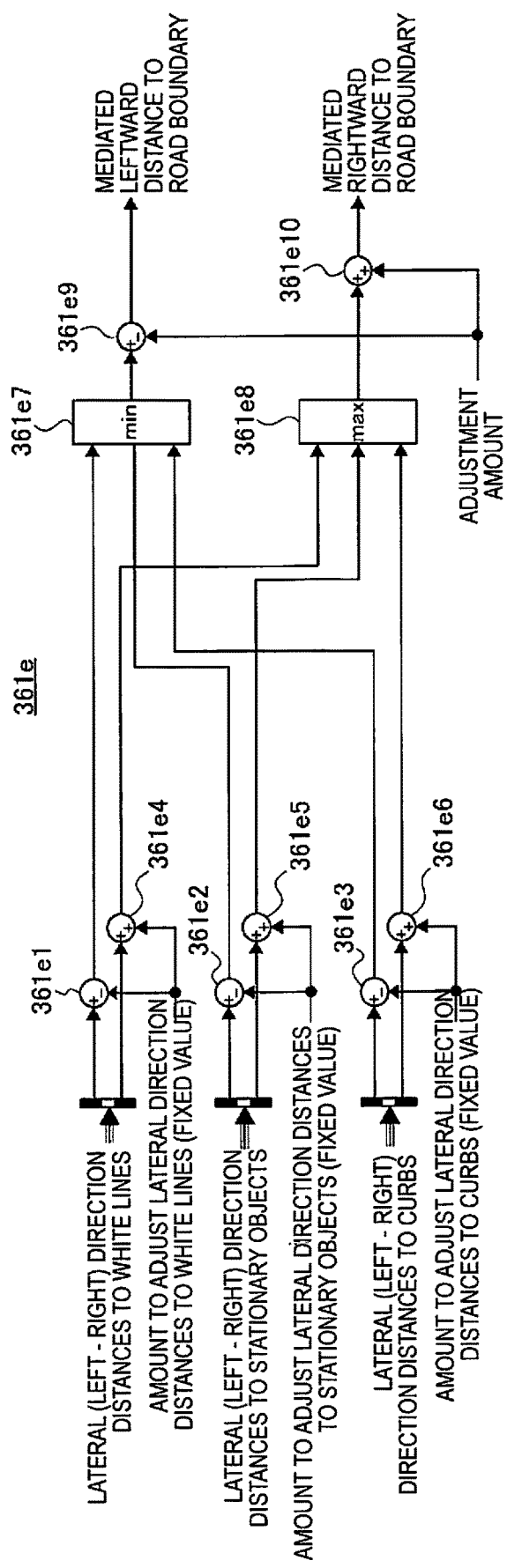
FIG. 6 is a detailed block diagram illustrating a mediation unit in the road boundary information consolidation unit illustrated in FIG. 5.

FIG. 5 illustrates a road boundary information consolidation unit 361 in the target route corrector 36. FIG. 6 illustrates a mediation unit 361e in the road boundary information consolidation unit 361. Detailed configuration of the road boundary information consolidation unit 361 will be described below with reference to FIGS. 5 and 6.

As illustrated in FIG. 5, the road boundary information consolidation unit 361 includes an OR circuit 361a, a selector 361b, a road boundary adjustment unit 361c, an adjustment amount adder 361d, the mediation unit 361e, and a one-side-loss supplementing unit 361f.

When the selector 361b does not receive, as an input, a direction indicator in-use-by-driver condition or a lane-change condition via the OR circuit 361a, the selector 361b selects a value of zero (fixed value) for an amount of lateral direction distance adjustment. When the selector 361b receives, as an input, a direction indicator in-use-by-driver condition or a lane-change condition via the OR circuit 361a, the selector 361b applies an amount of lateral direction distance adjustment that gradually reduces the sideways movement amount of the target route.

In other words, when moving the target route sideways in the lateral direction, if there is an intervening steering operation by the driver, the sideways movement amount of the target route is gradually reduced, and the assessment of a steering operation intervention by the driver is made using a turn signal operation by the driver.

The road boundary adjustment unit 361c receives, as input, vehicle speed, and the road boundary adjustment unit 361c applies an amount of lateral direction distance adjustment such that a lateral direction distance increases and the amount that the target route is corrected with sideways movement correspondingly decreases with respect to increases in the vehicle speed.

The adjustment amount adder 361d adds an amount of lateral direction distance adjustment from the selector 361b and an amount of lateral direction distance adjustment from the road boundary adjustment unit 361c together, and this sum is used as an amount of adjustment in the mediation unit 361e.

The mediation unit 361e receives, as inputs, (left and right) lateral direction distances to white lines, (left and right) lateral direction distances to stationary objects, (left and right) lateral direction distances to curbs, and an amount of lateral direction distance adjustment from the adjustment amount adder 361d. The mediation unit 361e outputs mediated leftward distances to road boundaries and mediated rightward distances to road boundaries. The mediation unit 361e will be described in detail below.

The one-side-loss supplementing unit 361f receives, as inputs, mediated leftward distances to road boundaries, mediated rightward distances to road boundaries, and vehicle speed. Of the mediated leftward distances to road boundaries and mediated rightward distances to road boundaries, when a portion of lateral direction distance information on one side has been lost, the one-side-loss supplementing unit 361f supplements the lateral direction distance information on the side of loss with the vehicle speed, and outputs (left and right) lateral direction distances to lane boundaries.

When a portion of lateral direction distance information is lost in situations where the shape of a road edge is not parallel to the road, of road edges detected within bounds corresponding to a prescribed distance that varies depending on the vehicle speed of the host vehicle, a detection value based on the road edge closest to the host vehicle is used as lane boundary information. Lateral direction distance information on the side of loss is supplemented thereby.

As illustrated in FIG. 6, the mediation unit 361e includes subtractors 361e1, 361e2, 361e3, adders 361e4, 361e5, 361e6, a minimum value selector 361e7, a maximum value selector 361e8, a last-stage subtractor 361e9, and a last-stage adder 361e10.

The (left and right) lateral direction distances to white lines adder 361e1 and subtractor 361e4 take a value of zero (fixed value) as an amount to adjust lateral direction distances to white lines.

In other words, "white lines" are recognized as lane edges for the target route of the host vehicle, and a lateral direction distance adjustment is not performed therefor.

The (left and right) lateral direction distances to stationary objects adder 361e2 and subtractor 361e5 take a prescribed value (fixed value) as an amount to adjust lateral direction distances to stationary objects.

In other words, "stationary objects" are recognized as ends of the road in which the host vehicle travels, and a lateral direction distance adjustment is performed in order to acquire lane edge information from road edges. Stated differently, when detecting the lane boundaries of a lane in which the host vehicle travels, if a position of a road edge (stationary object) is detected, an inside position corresponding to a prescribed width from a detected road edge (stationary object) is used as lane boundary information.

The (left and right) lateral direction distances to curbs adder 361e3 and subtractor 361e6 take a prescribed value (fixed value) as an amount to adjust lateral direction distances to curbs.
In other words, "curbs" are recognized as ends of the road in which the host vehicle travels, and a lateral direction distance adjustment is performed in order to acquire lane edge information from road edges. Stated differently, when detecting the lane boundaries of a lane in which the host vehicle travels, if a position of a road edge (curb) is detected, an inside position corresponding to a prescribed width from a detected road edge (curb) is used as lane boundary information.

The minimum value selector 361e7 receives, as inputs, (left) lateral direction distances to white lines that have passed through the subtractor 361e1, (left) lateral direction distances to stationary objects that have passed through the subtractor 361e2, and (left) lateral direction distances to curbs that have passed through the subtractor 361e3, selects a minimum value, and uses this value as a leftward direction distance to a road boundary. In other words, when detecting the lane boundaries of a lane in which the host vehicle travels, if both a position of a lane boundary (a white line position) and a position of road edge (a stationary object position or a curb position) are detected, a detection value of an inside position closer to the host vehicle is used as lane boundary information.

The maximum value selector 361e8 receives, as inputs, (right) lateral direction distances to white lines that have passed through the adder 361e4, (right) lateral direction distances to stationary objects that have passed through the adder 361e5, and (right) lateral direction distances to curbs that have passed through the adder 361e6, selects a maximum value, and uses this value as a rightward direction distance to a road boundary.

The last-stage subtractor 361e9 subtracts an amount of adjustment from the adjustment amount adder 361d from a leftward direction distance to a road boundary from the minimum value selector 361e7 yielding an adjusted leftward direction distance to a road boundary.

The last-stage adder 361e10 adds an amount of adjustment from the adjustment amount adder 361d to a rightward direction distance from the maximum value selector 361e8, resulting in an adjusted rightward direction distance to a road boundary.

Detailed Configuration of Lateral Correction Amount Calculation Unit 362

Figure 7:
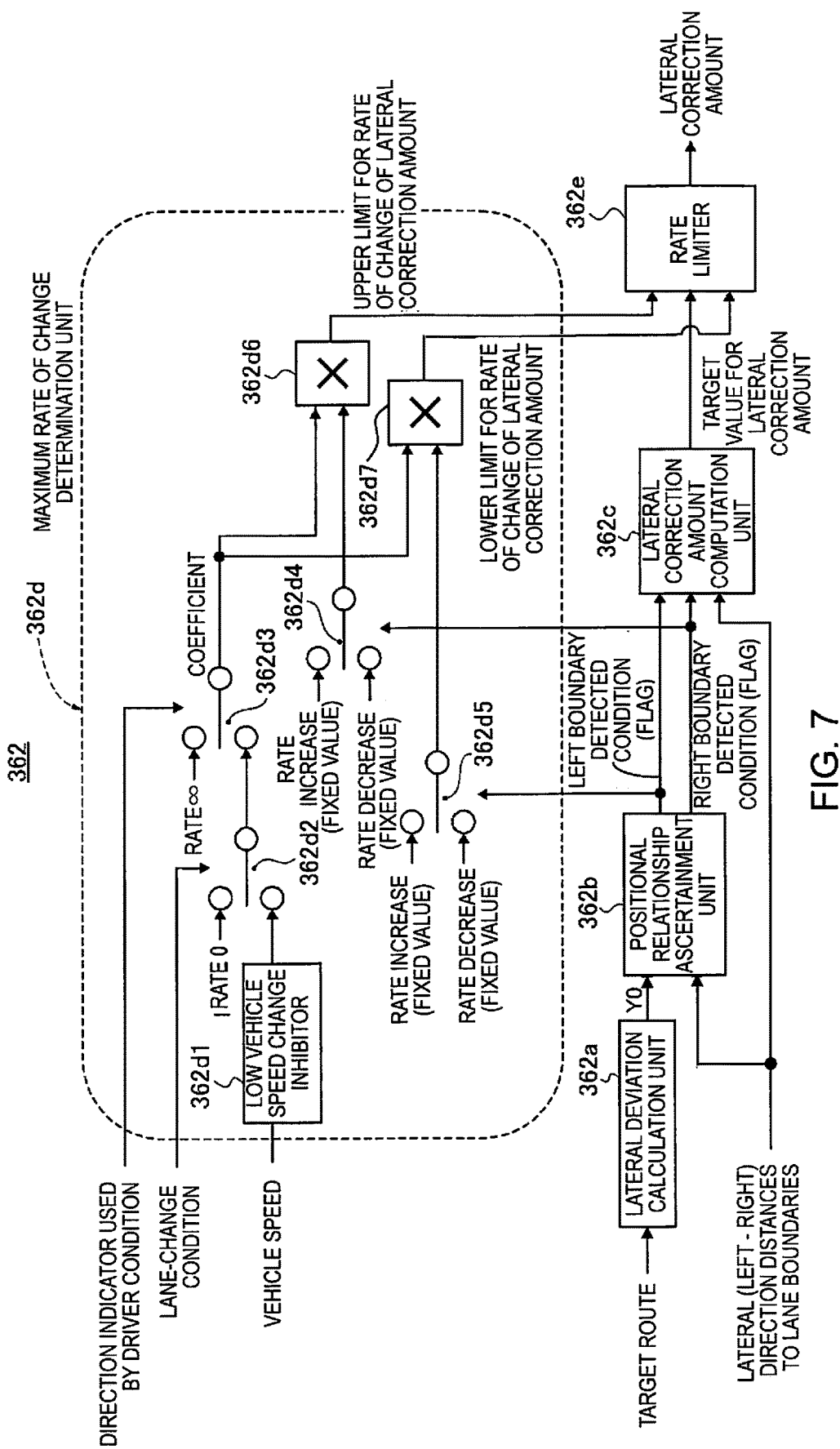
FIG. 7 is a detailed block diagram illustrating a lateral correction amount calculation unit in the target route corrector illustrated in FIG. 4.

FIG. 7 illustrates a lateral correction amount calculation unit 362 in the target route corrector 36. Detailed configuration of the lateral correction amount calculation unit 362 will be described below with reference to FIG. 7.

As illustrated in FIG. 7, the lateral correction amount calculation unit 362 includes a lateral deviation calculation unit 362a, a positional relationship ascertainment unit 362b, a lateral correction amount computation unit 362c, a maximum rate of change determination unit 362d, and a rate limiter 362e.

The lateral deviation calculation unit 362a, receives, as input, a target route from the route search processing unit 35, and calculates a lateral deviation Y0 between the target route and the host vehicle.

The positional relationship ascertainment unit 362b receives, as inputs, a lateral deviation Y0 from the lateral deviation calculation unit 362a, and (left and right) lateral direction distances to lane boundaries from the road boundary information consolidation unit 361. By comparing positional relationships between a target route and lane edges, the positional relationship ascertainment unit 362b comes to ascertain (grasp) the positional relationships between the target route and lane boundaries. In situations where the target route is within a prescribed distance of a (left) lane boundary, or in situations where the target route is on the opposite side of a (left) lane boundary to the host vehicle, the positional relationship ascertainment unit 362b outputs a left-boundary-detected condition (flag). In situations where the target route is within a prescribed distance of a (right) lane boundary, or in situations where the target route is on the opposite side of a (right) lane boundary to the host vehicle, the positional relationship ascertainment unit 362b outputs a right-boundary-detected condition (flag).

The lateral correction amount computation unit 362c receives, as inputs, a left-boundary-detected condition (flag) and a right-boundary-detected condition (flag) from the positional relationship ascertainment unit 362b, and (left and right) lateral direction distances to lane boundaries from the road boundary information consolidation unit 361. The lateral correction amount computation unit 362c computes a lateral correction amount so that a position of a target route and a position of the host vehicle are aligned, and then outputs a result of this computation as a target value for a lateral correction amount.

The maximum rate of change determination unit 362d receives, as inputs, a direction indicator in-use-by-driver condition, a lane-change condition, vehicle speed, a left-boundary-detected condition (flag), and a right-boundary-detected condition (flag). The maximum rate of change determination unit 362d determines a lower limit value and an upper limit value for a rate of change of the lateral correction amount (speed of movement of a target route). In other words, when correcting a target route with sideways movement in the lateral direction, the maximum rate of change determination unit 362d has functionality that not only restricts the speed of movement (rate of change of the lateral correction amount) at which the target route is moved sideways in the lateral direction to a prescribed speed, but also restricts the speed of movement in a manner that varies in accordance with circumstances. Detailed configuration of the maximum rate of change determination unit 362d will be described below.

The rate limiter 362e receives, as inputs, a target value for a lateral correction amount from the rate of change maximum value determination unit 362d, and a lower limit value for the rate of change of the lateral correction amount and an upper limit value for the rate of change of the lateral correction amount from the maximum rate of change determination unit 362d. The rate of change of the lateral correction amount (speed of movement of a target route) is used to apply a limit on the target value for a lateral correction amount, yielding a lateral correction amount.

The maximum rate of change determination unit 362d includes a low-vehicle-speed change inhibitor 362d1, a first rate-switching unit 362d2, a second rate-switching unit 362d3, a third rate-switching unit 362d4, a fourth rate-switching unit 362d5, a first rate-summing unit 362d6, and a second rate-summing unit 362d7.

The low-vehicle-speed change inhibitor 362d1 receives, as input, vehicle speed, and, if the vehicle speed of the host vehicle drops, chooses a vehicle-speed-contingent rate of change so that the speed of movement of a target route decreases in accordance with the drop in vehicle speed. If the host vehicle stops, the low-vehicle-speed change inhibitor 362d1 sets the vehicle-speed-contingent rate of change to zero.

Using the lane-change condition as a trigger, the first rate-switching unit 362d2 selects a vehicle-speed-contingent rate of change in normal travel scenarios not involving a lane change, and switches the rate of change to zero when input with a lane-change condition.

Using the direction indicator in-use-by-driver condition, the second rate-switching unit 362d3 switches to the rate of change from the first rate-switching unit 362d2 when the direction indicator is not in use, and switches the rate of change to infinity when input with a direction indicator in-use condition.

Using a right-boundary-detected condition (flag) as a trigger, the third rate-switching unit 362d4 switches between a rate increase (fixed value) and a rate decrease (fixed value).

Using a left-boundary-detected condition (flag) as a trigger, the fourth rate-switching unit 362d5 switches between a rate increase (fixed value) and a rate decrease (fixed value).

The first rate-summing unit 362d6 receives, as inputs, a rate of change from the second rate-switching unit 362d3 and a rate of change from the third rate-switching unit 362d4, and sums both rates of change to calculate an upper limit value for the rate of change of the lateral correction amount.

The second rate-summing unit 362d7 receives, as inputs, a rate of change from the second rate-switching unit 362d3 and a rate of change from the fourth rate-switching unit 362d5, and sums both rates of change to calculate an upper limit value for the rate of change of the lateral correction amount.

In the maximum rate of change determination unit 362d, the speed of movement (rate of change) of a target route is controlled as given below.

(a) When moving a target route sideways in the lateral direction, if the host vehicle performs a lane change, the speed of movement of the target route is set to zero and a sideways movement amount is held during the lane change (first rate-switching unit 362d2).

(b) When moving a target route sideways in the lateral direction, if the vehicle speed of the host vehicle drops, the speed of movement of the target route is decreased in accordance with the drop in vehicle speed (low-vehicle-speed change inhibitor 362d1).

(c) When moving a target route sideways in the lateral direction, if the host vehicle stops, the speed of movement of the target route is set to zero and a sideways movement amount is held (low-vehicle-speed change inhibitor 362d1).

(d) When moving a target route sideways in the lateral direction, if left and right lane edges are not detected near the host vehicle, the speed of movement of the target route to the left and right is decreased (third and fourth rate-switching units 362d4, 362d5).

(e) When moving a target route sideways in the lateral direction, if a lane edge is detected near the host vehicle on only the left side, the speed of movement of the target route to the left is decreased and the speed of movement of the target route to the right is increased (third and fourth rate-switching units 362d4, 362d5).

(f) When moving a target route sideways in the lateral direction, if a lane edge is detected near the host vehicle on only the right side, the speed of movement of the target route to the left is increased and the speed of movement of the target route to the right is decreased (third and fourth rate-switching units 362d4, 362d5).

(g) When moving a target route sideways in the lateral direction, if left and right lane edges are detected near the host vehicle, the speed of movement of the target route to the left and right is increased (third and fourth rate-switching units 362d4, 362d5).

Next, the operation will be described.

The operation of the first embodiment will be described under the headings "Operation for correcting a target route," "Operation of contrasting vehicle behavior when entering a narrow lane," and "Operation of contrasting vehicle behavior when entering a wide lane."

Operation for Correcting a Target Route

Figure 8:
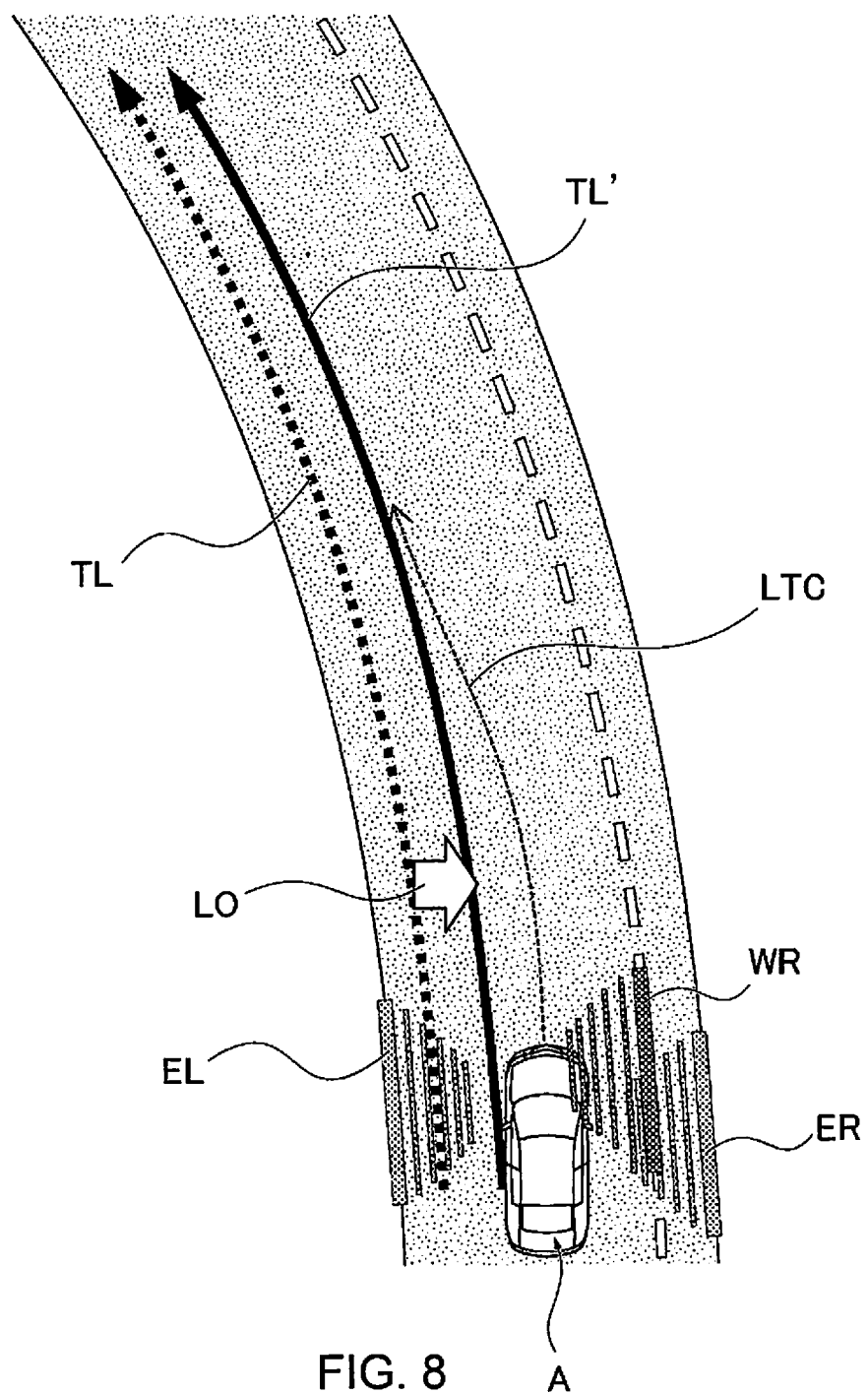
FIG. 8 is an explanatory diagram illustrating a target route correction operation performed by the target route corrector in the navigation control unit.

FIG. 8 illustrates operation for correcting a target route executed by the target route corrector 36 of the navigation control unit 3. Operation for correcting a target route will be described below with reference to FIG. 8.

In the first embodiment, the navigation control unit 3 is provided. The navigation control unit 3 corrects errors arising between a position of a host vehicle and a target route when a position of the host vehicle detected using navigation information is overlaid on map information during autonomous travel. The navigation control unit 3 includes the target route corrector 36, which corrects target routes. The target route corrector 36 includes the road boundary information consolidation unit 361, the lateral correction amount calculation unit 362, and the lateral/sideways movement unit 363.

Lane boundaries of the lane in which the host vehicle A travels are detected in the road boundary information consolidation unit 361. That is, as illustrated in FIG. 8, a right white line WR is detected as a lane boundary by the right recognition camera 13. Further, a curb ER at the right edge of the road and a curb EL at the left edge of the road are detected as road edges by the lidar 15, 15. Accordingly, in the situation illustrated in FIG. 8, the right lane boundary is at the inner side of the right white line WR, and the left lane boundary is at a position set toward the host vehicle A from the inner side of the curb EL.

Next, the positional relationships between a target route TL on a map and the left lane boundary and right lane boundary that were detected are compared in the lateral correction amount calculation unit 362. In the situation illustrated in FIG. 8, whereas there is sufficient distance between the target route TL and the right lane boundary, the distance between target route TL and the left lane boundary is too short. Accordingly, on the basis of an assessment that the target route TL is within a prescribed distance of the left lane boundary, an amount to offset the target route TL toward the right side of FIG. 8 is calculated as a lateral correction amount LO for the target route TL in the lateral correction amount calculation unit 362.

Upon the lateral correction amount LO being calculated by the lateral correction amount calculation unit 362, the target route TL is moved sideways in the lateral direction by the lateral correction amount LO to correct the target route TL in the lateral/sideways movement unit 363, thereby generating a new target route TL'. Accordingly, the host vehicle A performs autonomous travel using line trace control LTC so that the host vehicle A draws closer to the new target route TL' from the current position.

Thus, because the target route LT is moved sideways so that the host vehicle A stays within the lane of travel rather than correcting the self-position of the host vehicle, it is possible to make corrections that only consider vehicle behavior (selecting "smoothness" or "non-departing/non-colliding" according to the scenario).

Operation of Contrasting Vehicle Behavior when Entering a Narrow Lane

Figure 9:
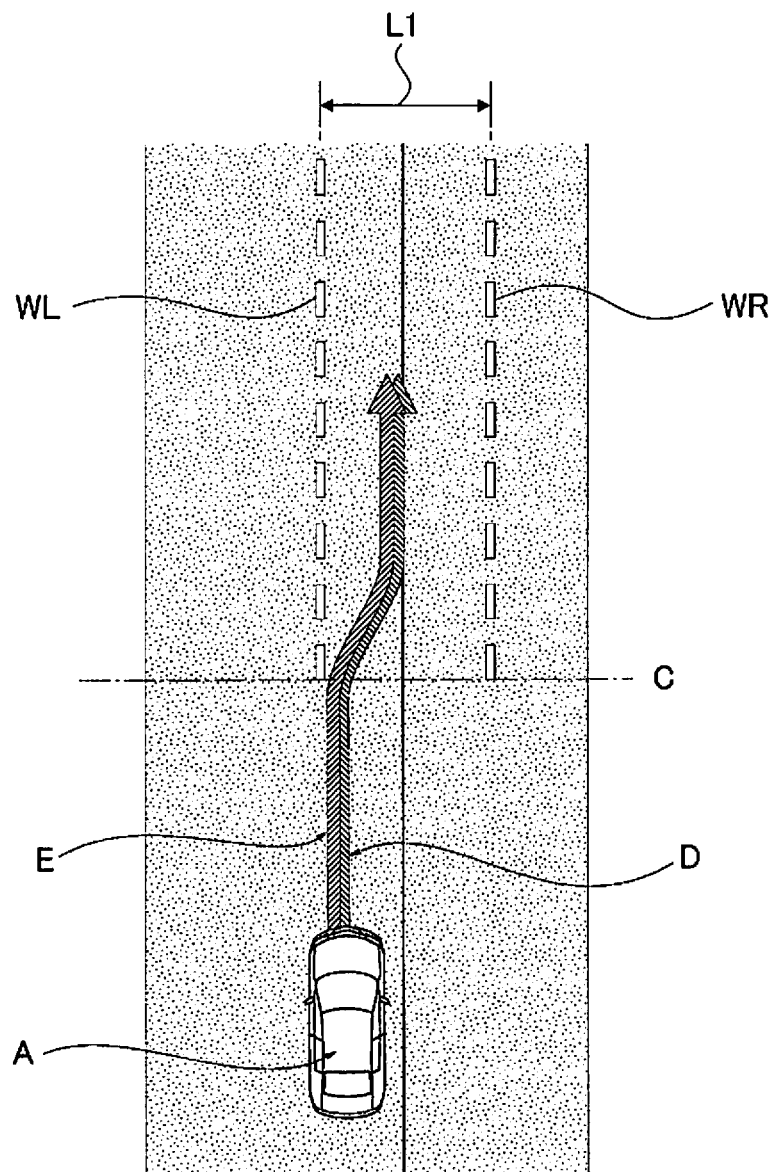
FIG. 9 is an explanatory diagram contrasting vehicle behavior in a comparative example and vehicle behavior in the first embodiment when entering a narrow lane in the target route correction operation.

FIG. 9 illustrates vehicle behavior in a comparative example and vehicle behavior in the first embodiment when entering a narrow lane during a target route correction operation. Operation of contrasting vehicle behavior when entering a narrow lane will be described below with reference to FIG. 9.

Here, the comparative example is defined as that in which navigational error arising between a position of a host vehicle and a target route is corrected by correcting the self-position of the host vehicle.

As illustrated in FIG. 9, entering a narrow lane refers to a scenario in which a host vehicle suddenly enters a narrow lane having a narrow lateral width L1 between left and right white lines WL, WR from a road that lacks left and right white lines WL, WR. In a scenario in which a narrow lane is entered, in the comparative example, when a host vehicle A reaches position C and recognizes a lane center, correction of the self-position of the host vehicle A is performed such that the lateral position of the host vehicle A quickly returns to the lane center. Accordingly, in the comparative example, the host vehicle A travels along travel line D.

In contrast, in a scenario in which a narrow lane is entered, in the first embodiment, when the host vehicle A reaches position C and the left white line WL is detected to be at a position overlapping with the host vehicle A, correction that moves the target route sideways in the lateral direction is performed with a speed of sideways movement that quickly returns the target route toward the lane center. Accordingly, in the first embodiment, the host vehicle A travels along travel line E, which is almost the same as travel line D.

Thus, entering a narrow lane is a scenario in which, of "smoothness" and "non-departing/non-colliding," "non-departing/non-colliding" is to be prioritized. To this, in the first embodiment, a target route correction with a high speed of sideways movement that prioritizes "non-departing/non-colliding" can be selected in a scenario in which a narrow lane is entered.

Operation of Contrasting Vehicle Behavior when Entering a Wide Lane

Figure 10:
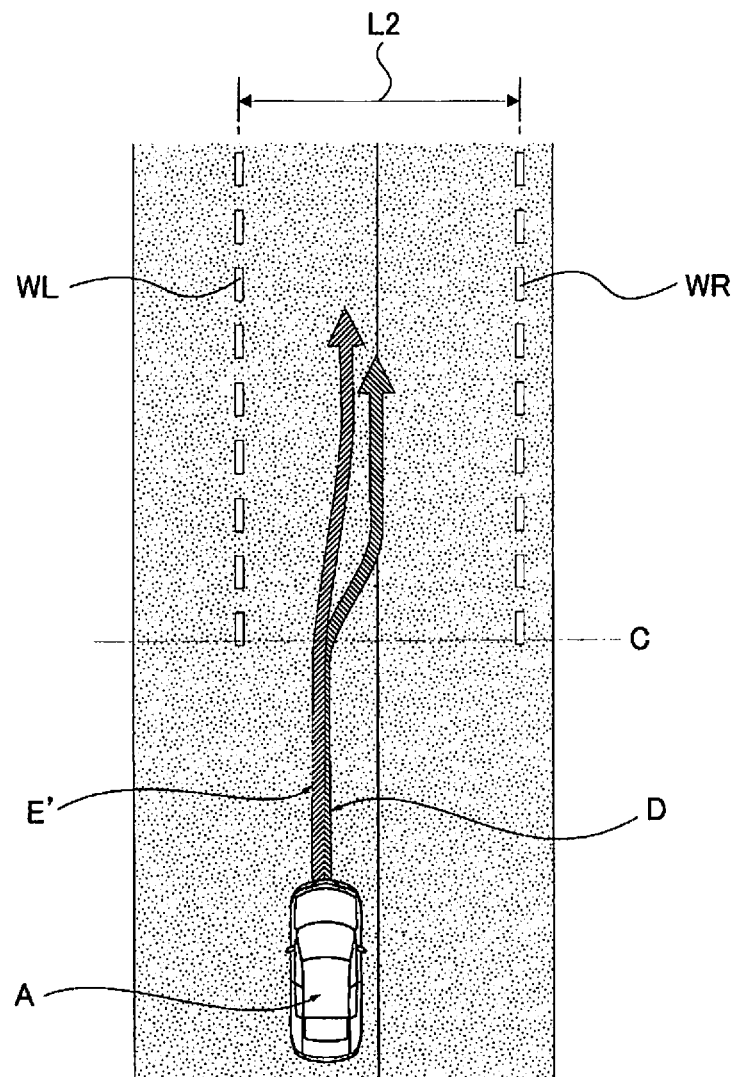
FIG. 10 is an explanatory diagram contrasting vehicle behavior in a comparative example and vehicle behavior in the first embodiment when entering a wide lane in the target route correction operation.

FIG. 10 illustrates vehicle behavior in a comparative example and vehicle behavior in the first embodiment when entering a wide lane in the target route correction operation. Operation of contrasting vehicle behavior when entering a wide lane will be described below with reference to FIG. 10. Here, the comparative example is defined as that in which navigational error arising between a position of a host vehicle and a target route is corrected by correcting the self-position of the host vehicle.

As illustrated in FIG. 10, entering a wide lane refers to a scenario in which a host vehicle suddenly enters a wide lane having a wide lateral width L2 (>L1) between left and right white lines WL, WR from a road that lacks left and right white lines WL, WR. In a scenario in which a wide lane is entered, in the comparative example, when a host vehicle A reaches position C and recognizes a lane center, correction of the self-position of the host vehicle A is performed such that the lateral position of the host vehicle A quickly returns to the lane center. Accordingly, in the comparative example, the host vehicle A travels along travel line D.

In contrast, in a scenario in which a wide lane is entered, in the first embodiment, when the host vehicle A reaches position C and the left white line WL is detected to be at a position a prescribed distance away from the host vehicle A, correction that moves the target route sideways in the lateral direction is performed with a speed of sideways movement that slowly returns the target route toward the lane center. Accordingly, in the first embodiment, the host vehicle A travels along travel line E', which, in contrast to travel line D, keeps a vehicle lateral G to a minimum.

Thus, entering a wide lane is a scenario in which, of "smoothness" and "non-departing/non-colliding," "smoothness" is to be prioritized. To this, in the first embodiment, a target route correction with a low speed of sideways movement that prioritizes "smoothness" can be selected in a scenario in which a wide lane is entered.

Next, the effects of the present disclosure will be described. The effects given below by way of example are achieved with the method and device for correcting a position error of an autonomous vehicle of the first embodiment.

(1) A controller (the navigation control unit 3) is provided that corrects error arising between a position of a host vehicle and a target route during drive-assisted travel (during autonomous travel). In a method for correcting a position error of a drive-assisted vehicle (the autonomous vehicle), a lane boundary of a lane in which the host vehicle travels is detected. Positional relationships between the lane boundary that was detected and a target route on a map are compared, and in situations where the target route is within a prescribed distance of the lane boundary, or in situations where the target route is on the opposite side of the lane boundary to the host vehicle, the target route is corrected with sideways movement in a lateral direction (FIG. 8). Accordingly, a method for correcting a position error of a drive-assisted vehicle (the autonomous vehicle) can be provided with which it is possible to select whether to prioritize smoothness or to prioritize non-departure, depending on the scenario, and vehicle behavior where it is possible to feel more at ease is achieved.

(2) When detecting the lane boundary of the lane in which the host vehicle travels, if a position of a road edge is detected, an inside position corresponding to a prescribed width from the detected road edge is used as lane boundary information (FIG. 6). Accordingly, on top of the effect of (1), even on roads that lack a lane boundary (white line), provided that a road edge such as a curb can be detected, the correction of a target route with sideways movement in a lateral direction can continue.

(3) When detecting the lane boundary of the lane in which the host vehicle travels, if both a position of a lane boundary and a position of road edge are detected, a detection value of an inside position closer to the host vehicle is used as lane boundary information (FIG. 6). Accordingly, on top of the effect of (2), the host vehicle can travel a prescribed distance inside of a position where a road edge such as a curb is present, and the driver can feel more at ease.

(4) When detecting the lane boundary of the lane in which the host vehicle travels, of road edges detected within bounds corresponding to a prescribed distance that varies depending on the vehicle speed of the host vehicle, a detection value based on the road edge closest to the host vehicle is used as lane boundary information (FIG. 5). Accordingly, on top of the effect of (2) or (3), even in locations where the shape of a road edge is not parallel to the road, it is possible to achieve the correction of a target route with sideways movement in a lateral direction.

(5) When correcting the target route with sideways movement in the lateral direction, a speed of movement at which the target route is moved sideways in the lateral direction is restricted to a prescribed speed (FIG. 7). Accordingly, on top of the effects of (1) to (4), by restricting the speed of movement at which the target route is moved sideways in the lateral direction to a prescribed speed, the vehicle behavior of the host vehicle can be made smooth.

(6) When correcting the target route with sideways movement in the lateral direction, the speed of movement at which the target route is moved sideways in the lateral direction is restricted in a manner that varies in accordance with circumstances (FIG. 7). Accordingly, on top of the effect of (5), it is possible to select which of "smoothness" and "non-departing/non-colliding" to prioritize according the scenario. This results in vehicle behavior where it is possible to feel more at ease than when a speed of movement is assigned using a fixed speed.

(7) When moving the target route sideways in the lateral direction: if left and right lane edges are not detected near the host vehicle, the speed of movement of the target route to the left and right is decreased; if a lane edge is detected near the host vehicle on only the left side, the speed of movement of the target route to the left is decreased and the speed of movement of the target route to the right is increased; if a lane edge is detected near the host vehicle on only the right side, the speed of movement of the target route to the left is increased and the speed of movement of the target route to the right is decreased; and if left and right lane edges are detected near the host vehicle, the speed of movement of the target route to the left and right is increased (FIG. 7). Accordingly, on top of the effect of (6), when a white line or a curb is detected nearby, the host vehicle quickly moves away from the white line or curb, whereby "non-departing/non-colliding" can be prioritized. If a white line or a curb is not detected nearby, the host vehicle slowly performs lateral movement, whereby "smoothness" can be prioritized.

(8) When moving the target route sideways in the lateral direction, if the host vehicle performs a lane change, the speed of movement of the target route is set to zero and a sideways movement amount is held during the lane change (FIG. 7). Accordingly, on top of the effect of (6) or (7), due to the target route and the lane boundary crossing, unnecessary corrections of the target route can be prevented, and corrections to the target route can continue until the lane change is complete. This results in "smooth" and "non-departing/non-colliding" vehicle behavior, including in the lane change.

(9) When moving the target route sideways in the lateral direction, if the vehicle speed of the host vehicle drops, the speed of movement of the target route is decreased in accordance with the drop in vehicle speed (FIG. 7). Accordingly, on top of the effects of (6) to (8), by decreasing the speed of sideways movement and reducing a steering angle when vehicle speed drops, a sense of security can be imparted to the driver. When the vehicle speed drops, if the steering angle is not increased, the same speed of lateral movement cannot be ensured.

(10) When moving the target route sideways in the lateral direction, if the host vehicle stops, the speed of movement of the target route is set to zero and an sideways movement amount is held (FIG. 7). Accordingly, on top of the effect of (9), by preventing the steering wheel from moving in accordance with the correction of the target route when stopped, a sense of security can be imparted to the driver.

(11) When moving the target route sideways in the lateral direction, if there is an intervening steering operation by a driver, a sideways movement amount of the target route is gradually reduced (FIG. 5). Accordingly, on top of the effects of (1) to (10), in response to a large change in the positional relationship between the target route and a lane edge detection result when there is a steering operation intervention, by gradually reducing a sideways movement amount of the target route, unnecessary corrections to the target route can be prevented.

(12) An assessment of a steering operation intervention by the driver is made using a turn signal operation by the driver (FIG. 5). Accordingly, on top of the effect of (11), intent of the driver to perform an intervening steering operation can be reliably and quickly reflected by making an assessment using a turn signal operation prior to a steering operation.

(13) A controller (navigation control unit 3) is provided that corrects error arising between a position of a host vehicle and a target route during drive-assisted travel (during autonomous travel). In a device for correcting a position error of a drive-assisted vehicle (autonomous vehicle), a controller (navigation control unit 3) includes a target route corrector 36 that corrects the target route. The target route corrector 36 includes a lane boundary detection unit (road boundary information consolidation unit 361), a lateral correction amount calculation unit 362, and a lateral/sideways movement unit 363. The lane boundary detection unit (road boundary information consolidation unit 361) detects a lane boundary of a lane in which the host vehicle travels. The lateral correction amount calculation unit 362 compares positional relationships between a lane boundary that was detected and a target route on a map, and in situations where the target route is within a prescribed distance of the lane boundary, or in situations where the target route is on the opposite side of the lane boundary to the host vehicle, calculates a lateral correction amount for the target route. The lateral/sideways movement unit 363, upon the calculation of the lateral correction amount, moves the target route sideways in a lateral direction by the lateral correction amount to correct the target route (FIG. 4). Accordingly a device for correcting a position error of a drive-assisted vehicle (autonomous vehicle) can be provided with which it is possible to select whether to prioritize smoothness or to prioritize non-departure, depending on the scenario, and vehicle behavior where it is possible to feel more at ease is achieved.

In the foregoing, a method and device for correcting a position error of a drive-assisted vehicle of the present disclosure was described with reference to the first embodiment. However, the specific configuration thereof is not limited to that of the first embodiment, and design modifications, additions, etc., are possible without departing from the spirit of the invention as set forth in the accompanying claims.

In the first embodiment, an example was presented in which the navigation control unit 3 is used as a controller that generates a target route to a destination from the current position of a host vehicle. However, an autonomous driving control unit could be used as a controller that generates a target route to a destination from the current position of a host vehicle. The target route generation functionality can also be split into two, whereby part of this functionality is assigned to a navigation control unit, with the remainder being assigned to an autonomous driving control unit.

In the first embodiment, an example was presented in which the method and device for correcting a position error of the present disclosure are applied to an autonomous vehicle in which steering/drive/braking are automatically controlled according to an autonomous driving mode selection. However, the method and device for correcting a position error of the present disclosure can be applied to any drive-assisted vehicle that assists any part of a steering operation/drive operation/braking operation by a driver. In short, the method and device for correcting a position error of the present disclosure can be applied to any vehicle that assists the driving of a driver by correcting error arising between a position of the host vehicle and a target route.

The invention claimed is:

1. A vehicle position correction method for correcting a target route of a host vehicle comprising a controller that corrects the target route of the host vehicle during drive-assisted travel, the vehicle position correction method comprising:
generating the target route for the host vehicle based on a destination and a current position of the host vehicle;
detecting a lane boundary of a lane in which the host vehicle travels;
comparing positional relationships between the lane boundary that was detected and the generated target route on a map; and
correcting the generated target route with a movement amount in a lateral direction with respect to a driving direction of the host vehicle when the generated target route is within a prescribed distance of the lane boundary, or when the generated target route is on an opposite side of the lane boundary with respect to the host vehicle.

2. The vehicle position correction method according to claim 1, wherein
when detecting the lane boundary of the lane in which the host vehicle travels, if a position of a road edge is detected, an inside position corresponding to a prescribed width from the detected road edge is used as lane boundary information.

3. The vehicle position correction method according to claim 2, wherein
when detecting the lane boundary of the lane in which the host vehicle travels, if both a position of a lane boundary and the position of the road edge are detected, a detection value of an inside position closer to the host vehicle is used as lane boundary information.

4. The vehicle position correction method according to claim 2, wherein
when detecting the lane boundary of the lane in which the host vehicle travels, of road edges detected within bounds corresponding to a prescribed distance that varies depending on the vehicle speed of the host vehicle, a detection value based on the road edge closest to the host vehicle is used as lane boundary information.

5. The vehicle position correction method according to claim 1, wherein
when correcting the generated target route with the movement amount in the lateral direction, a speed of movement at which the generated target route is moved in the lateral direction is restricted to a prescribed speed.

6. The position correction method according to claim 5, wherein
when correcting the generated target route with the movement amount in the lateral direction, the speed of movement at which the generated target route is moved in the lateral direction is restricted in a manner that varies in accordance with circumstances.

7. The vehicle position correction method according to claim 6, wherein when moving the generated target route in the lateral direction:
if left and right lane edges are not detected near the host vehicle, the speed of movement of the generated target route to the left and right is decreased,
if a lane edge is detected near the host vehicle on only a left side, the speed of movement of the generated target route to the left is decreased and the speed of movement of the generated target route to the right is increased,
if a lane edge is detected near the host vehicle on only a right side, the speed of movement of the generated target route to the left is increased and the speed of movement of the generated target route to the right is decreased, and
if left and right lane edges are detected near the host vehicle, the speed of movement of the generated target route to the left and right is increased.

8. The vehicle position correction method according to claim 6, wherein
when moving the generated target route in the lateral direction, if the host vehicle performs a lane change, the speed of movement of the generated target route is set to zero and the movement amount is held during the lane change.

9. The vehicle position correction method according to claim 6, wherein
when moving the generated target route in the lateral direction, if the vehicle speed of the host vehicle drops, the speed of movement of the generated target route is decreased in accordance with the drop in vehicle speed.

10. The vehicle position correction method according to claim 9, wherein
when moving the generated target route in the lateral direction, if the host vehicle stops, the speed of movement of the generated target route is set to zero and the movement amount is held.

11. The vehicle position correction method according to claim 1, wherein
when moving the generated target route in the lateral direction, if there is an intervening steering operation by a driver, the movement amount of the generated target route is gradually reduced.

12. The vehicle position correction method according to claim 11, wherein
an assessment of a steering operation intervention by the driver is made using a turn signal operation by the driver.

13. A vehicle position correction device for correcting a target route of a host vehicle comprising:
a controller that corrects the target route of the host vehicle during drive-assisted travel,
the controller configured to:
generate the target route for the host vehicle based on a destination and a current position of the host vehicle,
detect a lane boundary of a lane in which the host vehicle travels,
compare positional relationships between the lane boundary that was detected and the generated target route on a map,
calculate a lateral correction amount for the generated target route when the generated target route is within a prescribed distance of the lane boundary, or when the generated target route is on the opposite side of the lane boundary with respect to the host vehicle, and
move the generated target route in a lateral direction with respect to a driving direction of the host vehicle by the lateral correction amount to correct the generated target route, upon calculating the lateral correction amount.

14. The vehicle position correction method according to claim 1, wherein
the target route is generated based on a travel trajectory of a lead vehicle.

15. The vehicle position correction method according to claim 1, wherein
the target route is generated based on GPS and road map information.

16. The vehicle position correction device according to claim 13, wherein
the target route is generated based on a travel trajectory of a lead vehicle.

17. The vehicle position correction device according to claim 13, wherein
the target route is generated based on based on GPS and road map information.

18. The vehicle position correction method according to claim 1, wherein
the destination on which the target route is based is a final destination.

19. The vehicle position correction device according to claim 13, wherein
the destination on which the target route is based is a final destination.

* * * * *